FIG.3.

Patented Jan. 23, 1951

2,539,180

UNITED STATES PATENT OFFICE 2,539,180

GRIPPER MECHANISM FOR AXMINSTER-CARPET AND OTHER TUFTED-FABRIC LOOMS

Cecil Charles Brinton, Worcester, England, assignor of one-half to Brintons Limited, Worcester, England Application October 18, 1947, Serial No. 780,616
In Great Britain October 22, 1946

19 Claims. (Cl. 139—7)

This invention has reference to the gripper mechanism for Axminster carpet and other tufted-fabric looms.

As is well known, it is customary in looms of this type, for lengths of yarn, arranged at the same pitch as the tufts in each tuft row embodied in the carpet or fabric, to extend through a carriage with their free ends projecting beyond the said carriage. Thus, the said projecting ends are located so that they can be seized and drawn out of the carriage through a distance at least equal to the length of tufts, by a gripper mechanism; the withdrawn portions are then severed from the yarns in the form of tufts which remain seized by the gripper mechanism which latter then transfers the tufts to a position wherein they may be embodied in the carpet or other fabric.

It has already been proposed to provide a gripper mechanism wherein two rows of tuft grippers are disposed along opposite sides of a unit adapted to be rotated intermittently in steps or stages of 180°, and the principal object of the present invention is to provide a new or improved gripper mechanism of the intermittently rotatable type.

A further object of the invention is to provide a gripper mechanism which is capable of severing tufts from the yarns and placing them in position ready for embodiment in a carpet or other fabric, at a greater speed than heretofore.

Another object of the invention is to provide a new or improved construction of gripper for incorporation in the gripper mechanism.

Still another object of the invention is to arrange for the jaws of the grippers to be opened and closed by a novel form of actuator which is also embodied in the gripper mechanism.

Again the invention aims at so assembling the gripper mechanism in the loom and so associating actuating means with the said mechanism that the yarn ends are drawn away from the yarn carriage and the tufts are transferred into position for embodiment in a carpet or other fabric, rapidly and accurately.

These and other objects and advantages of the invention will become apparent upon consideration of the following detailed specification and the accompanying drawings wherein there is specifically disclosed the preferred embodiment of the invention.

In the drawings—

Figures 1A to 5A are complete transverse sections of Figures 1–5 respectively.

In the said drawings, 1 is an intermittently rotatable beam which is journalled, at its opposite ends, in the frame 2 of the loom. Intermediate its ends, the beam is substantially rectangular in cross section (see Figures 1A–5A) and in two of its opposed faces there are provided a number of transverse wells 3 the mouths of which open into wider transverse grooves 4 (see Figure 8A).

A row of grippers 5 and 5a is slidably accommodated between each of the said grooved and welled faces and a complementary cover plate 6 and 6a, the said rows of grippers extending, in parallel planes, to opposite sides of the beam. The cover plates are formed longitudinally of their faces adjacent the beam, with channels 7 and 7a respectively, in each of which channels a bar 8 and 8a is slidably accommodated.

Each row of grippers 5 and 5a consists of a plate-like unit 9 and 9a respectively, extending along the beam and projecting laterally of the complementary cover plate 6 or 6a, its projecting edge which is remote from the beam being formed with a plurality of teeth 10 arranged side by side and so spaced apart that the distance between the longer centre lines of adjacent teeth is equal to the pitch of the tufts in the finished carpet or fabric. On its opposite or inner edge, each unit 9 (or 9a) is formed with a number of tongues 11 (or 11a) each of which makes a sliding fit in a complementary groove 4 in a beam face. On the face of each tongue remote from the beam, there is formed a boss or projection 12 (or 12a) the two opposed sides 13 of which are inclined at the same angle to the axis of the beam.

The bosses 12 (or 12a) make sliding engagement with complementary grooves 14 (or 14a) formed in the abutting face of the bar 8 (or 8a), with the inclined sides 13 closely abutting the channel sides which are also inclined to the axis of the beam at the same angle as the said boss sides 13. Thus by reciprocating the bars 8 and 8a lengthwise of the beam, the plate-like units 9 and 9a are compelled, by the movement of the bosses 12 and 12a along the grooves 14 and 14a, to extend from and retract into the beam.

Each extension or tongue 11 and 11a, is also provided, on its face adjacent the beam 1, with a transverse groove 15 of arcuate section, in which a rib 16 of a toothed movable segment 17 or 17a engages. Each row of grippers 5 and 5a includes a system of segments 17 and 17a, the segments of each system being arranged in edge-to-edge contact along the whole length of the complementary plate-like unit 9 or 9a. Each segment is formed, along its edge remote from the beam, with teeth 18 arranged at the same pitch as the teeth 19, each tooth 18 registering with a tooth 19; the said units 9 and 9a and segments 17 and 17a form tuft-gripping jaws extending along each row of grippers. Each segment 17 and 17a is formed on its edge adjacent the beam, with an inclined and bifurcated tail piece 19 which embraces a complementary stud 20 on the plate-like unit 9 and 9a respectively, and which is impinged by one end of a blade spring 21, the latter being secured at its other end to a tongue or extension 11 or 11a, as the case may be. Thus the springs 21, which are accommodated in the wells 3, tend to drive the tail pieces 19 into contact with the tongues 11 and 11a to open and separate the toothed edges of the plate-like units 9 and 9a and the segments 17 and 17a and thereby open the tuft-gripping jaws.

Figures 6, 6A, 7, 7A, 8, 8A:
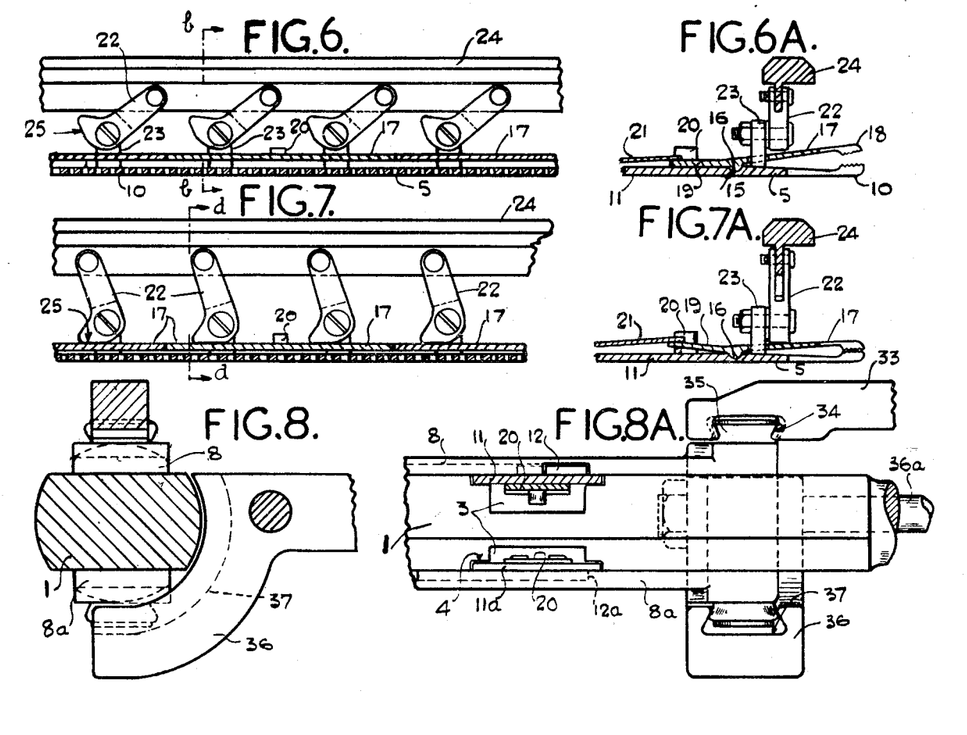
Figure 6 is a section taken along the line a—a of Figure 4A.
Figure 6A is a section taken along the line b—b of Figure 6.
Figure 7 is a section taken along the line c—c of Figure 1A.
Figure 7A is a section taken along the line d—d of Figure 7.
Figure 8 is a section taken along the line e—e of Figure 2.
Figure 8A is a section taken along the line f—f of Figure 2.

To enable the segments to be swung about their ribs 16 against spring action and thereby close the said jaws, there is associated with each gripper row 5 and 5a, a complementary system of cams 22 and 22a. To ensure that all the teeth of each segment make uniform and instantaneous contact with the teeth of the complementary plate-like unit with which they register, each segment is adapted to be displaced by two of the cams, as is best shown in Figures 6 and 7. Each cam consists of a lever journalled upon a bracket 23 which projects from the plate-like unit 9 (or 9a) through an aperture in the complementary segment 17 (or 17a). All the levers 22 of one cam system are coupled to a common link 24 whereas the levers 22a of the other cam system are coupled to a similar link 24a, the said links being capable of longitudinal movement in one direction lengthwise of the beam for driving the segments in their jaw-closing positions (Figure 7) or of longitudinal movement in the reverse direction to allow the segments to be spring driven to their jaw-opening positions (Figure 6). A flat segment-contacting face 25 is formed on each cam lever 22 and 22a to ensure that, when holding the segments in their jaw-closing positions, the levers will be prevented from turning inadvertently about the brackets 23. Each link is formed at one end, with a hook 26 for the purpose hereinafter to be referred to.

The beam is rotatably mounted in the frame 2 of the loom intermediate and parallel to a yarn carriage 27, of any known and suitable construction in which yarns 28 are carried at a pitch equal to the pitch of the teeth 18 and 19 and of the tufts in the finished carpet or fabric, and a fixed bed (not shown) where tufts are to be embodied in the finished carpet or fabric.

Mechanism 29 for severing the tufts from the yarns, is journalled in the top of the yarn carriage, the said mechanism preferably being constructed and operated as described and claimed in the specification of my co-pending application for Letters Patent Serial No. 780,615, dated October 18, 1947, now Patent No. 2,512,302.

A push rod 30 and a pull rod 31 are mounted in the frame 2 at one end of the loom for engaging and displacing the cam links 24 and 24a, the rod 31 being formed with a hook 32 for engaging the hook 26 on each of the said links.

For imparting longitudinal movement to the bars 8 and 8a, a rod 33 is slidably mounted within the loom frame, vertically above the beam 1, the said bar-actuating rod 33 being formed in its underside with a transverse jaw 34 for engaging with a roller 35 on the adjacent end of each of the bars 8 and 8a in succession.

Also a guide 36 having an arcuate runway 37 is carried upon an end of another rod 36a slidably carried in the loom frame 2, the said guide extending around a quarter of the periphery of the beam 1 and being so located that, as the beam makes each intermittent angular movement, a roller 35 on one or other of the said bars 8 and 8a enters the runway 37 and remains within the latter (see Figure 8) at the termination of the said movement.

Figure 1:
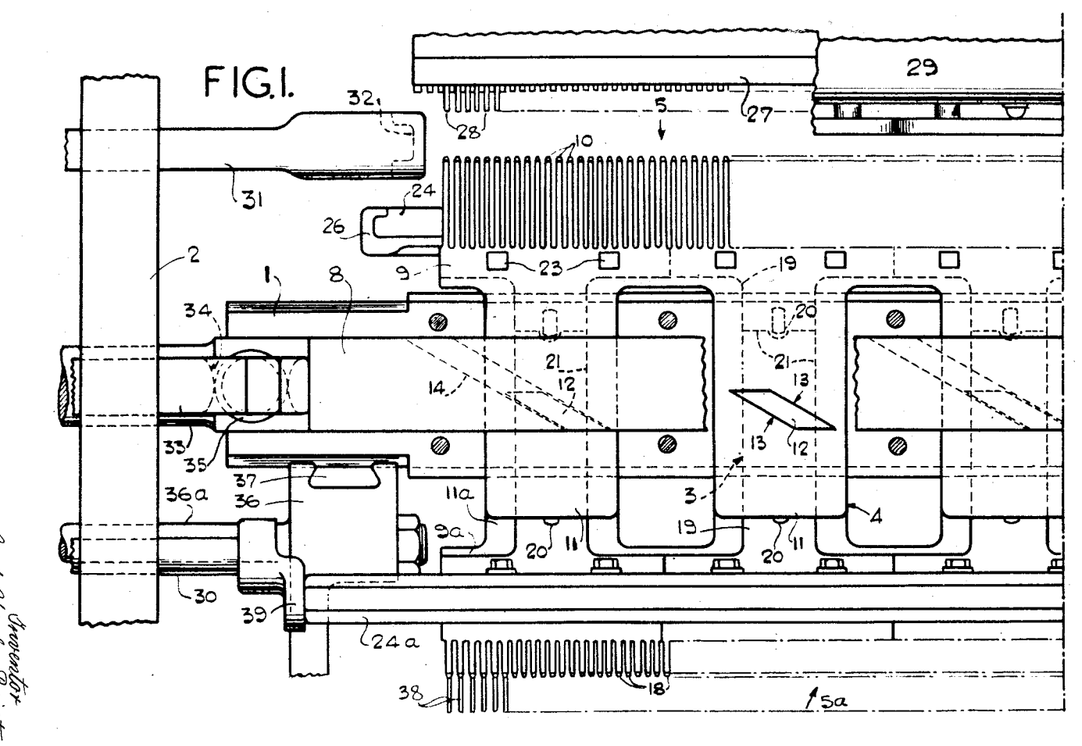
Figures 1–5 are plan views of one end of the gripper mechanism showing the sequence of events during each interval between successive intermittent rotary movements of the mechanism, parts of which are removed or broken away in Figures 1, 2 and 4 to show the internal construction.
Figure 1A:
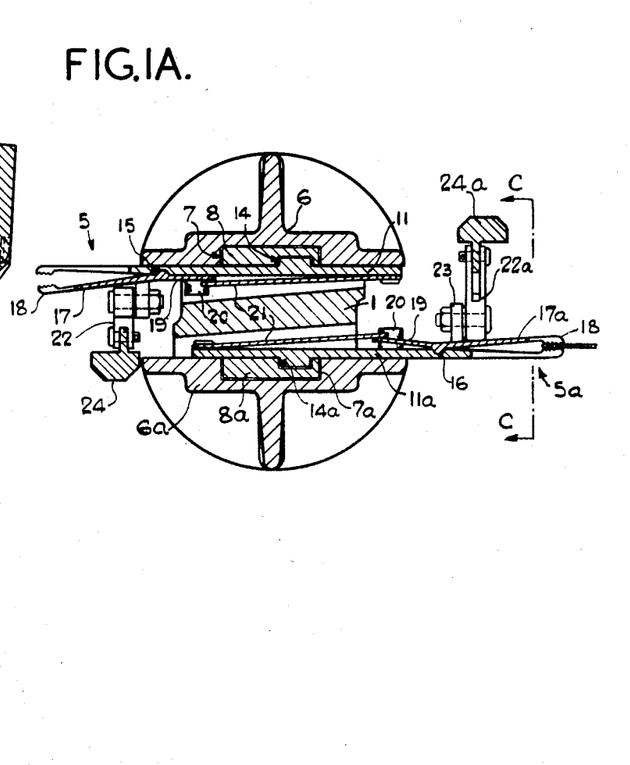

Figures 1 and 1A show the relative positions assumed by the beam 1, gripper rows 5 and 5a, bars 8 and 8a, cams 22 and 22a, tuft-cutting mechanism 29, operating rods 30, 31 and 33 and guide 36, as the beam finishes each of its intermittent rotational movements of 180°. As shown, the jaws of the row of grippers 5, formed by the toothed edges of the unit 9 and segments 17, are open, the cam levers 22 having been swung to a position wherein they are out of contact with the said segments; the said row of grippers is also retracted into the beam so that its jaws are spaced from the ends of the yarns 28.

The jaws of the other row of grippers 5a are closed upon a row of tufts 38 as a consequence of the teeth 18 on the segments 17a having been driven towards the teeth 19 of the plate-like unit 9a by the cam levers 22a. The row of grippers 5a is extended from the beam 1 so that the row of tufts 38 is held in the desired position relatively to the fixed bed preparatory to being embodied in a carpet or fabric.

The roller 35 of the bar 8 is in engagement with the jaw 34 of the rod 33; the link 24a of the gripper row 5a is in alignment with a finger 39 on the rod 30, whereas, as mentioned above, the roller 35 of the other bar 8a is in engagement with the arcuate channel 37 of the guide 36. The bar 8 and rod 33 are at the end of their gripper retracting strokes so that the bosses 12 of the plate-extensions 11 are at the ends of the grooves 14 further from the said rod 33. On the other hand, the guide 36 and rod 8a are at the end of their gripper extending strokes so that the bosses 12a of the plate-extensions 11a, are at the ends of the grooves 14a nearer the said guide and rod 33.

Figure 2:
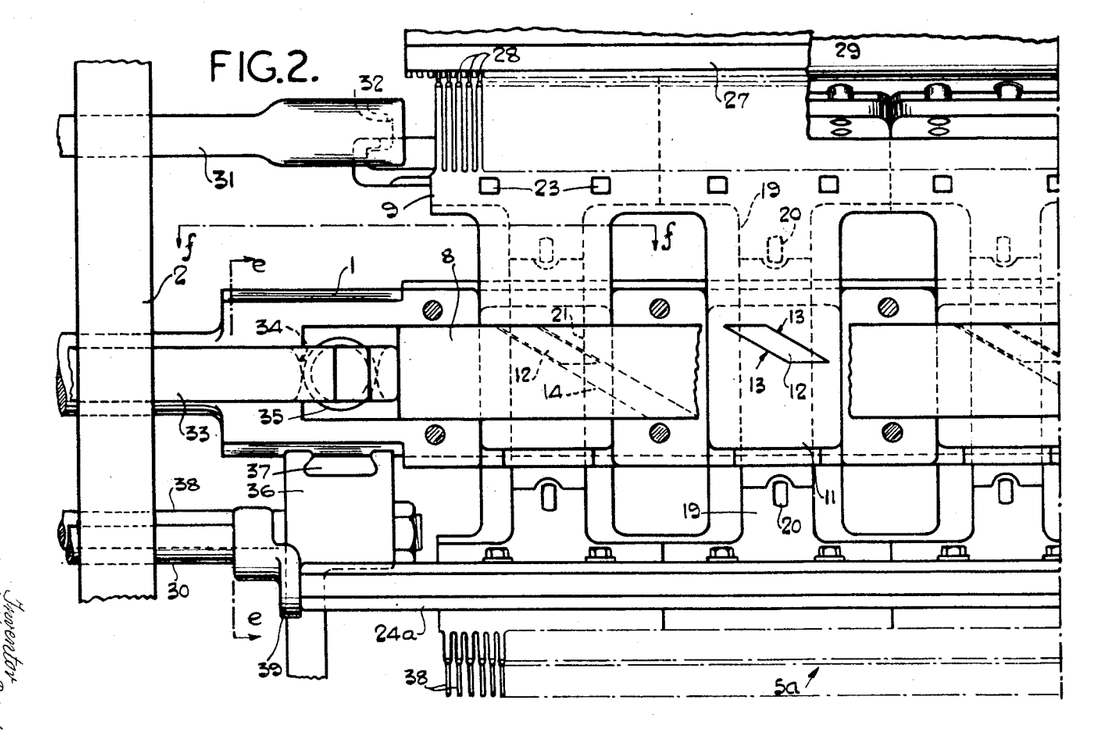
Figure 2A:
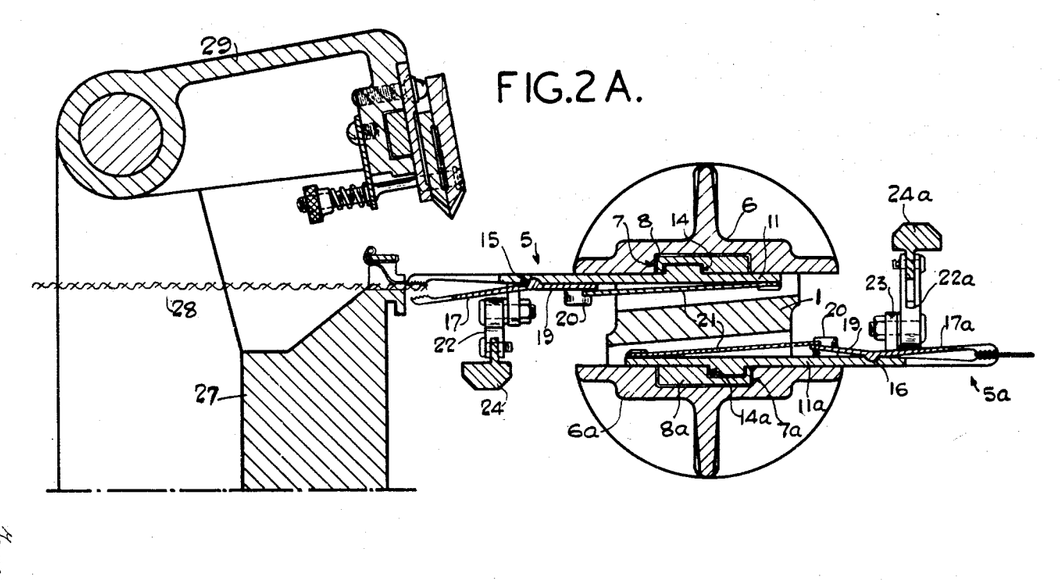

The cycle of operations commences by the rod 33 being driven axially towards the gripper mechanism to impart a longitudinal movement to the bar 8 endwise of the beam; this movement, which is the gripper extending stroke, causes the bosses 12 to move along the grooves 14 to the ends of the latter nearer the rod 33, with the consequence that the extensions 11, and therefore the whole of the row of grippers 5, including the unit 9, segments 17, cam levers 22 and link 24, are displaced laterally outwards of the beam 1 between the complementary grooved and welded beam face and the cover plate 6. This outwards movement takes the open jaws towards the yarn carriage so that the ends of the yarns 28, which protrude from the carriage, are located between the teeth 10 and 18 when the extension of the gripper row is completed (see Figures 2 and 2A). The extension of the grippers also takes the hooked end 26 of the link 24 into overlapping relationship with the hook 32 of the rod 31, the link hook being located between the rod hook 32 and the frame 2.

Figure 3:
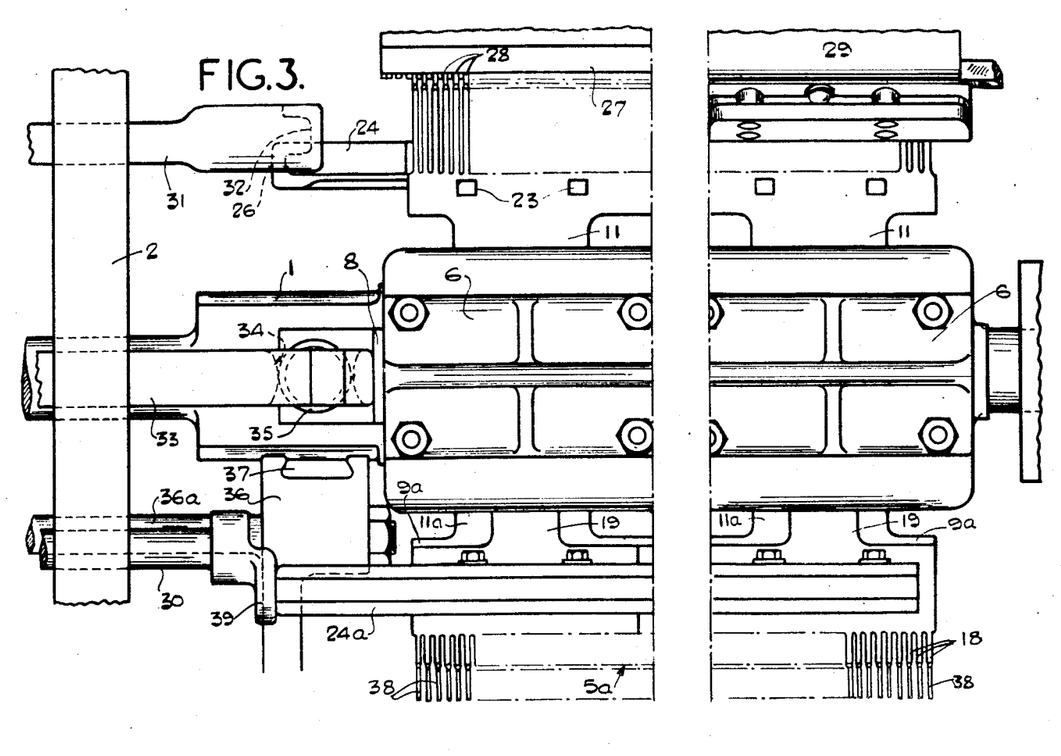
Figure 3A:
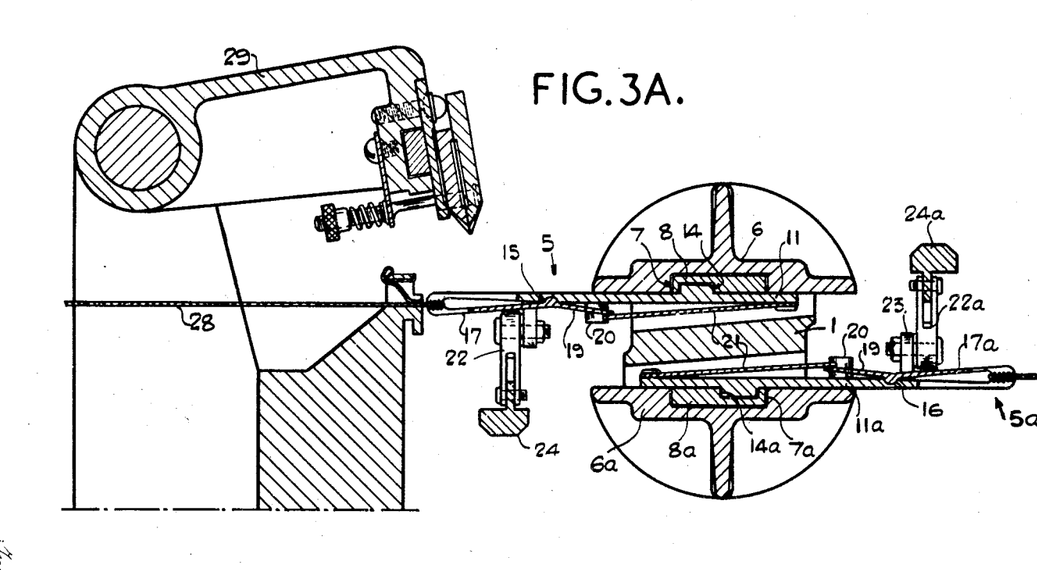

Consequently, when the next step in the cycle of operations, which consists of imparting to the said rod 31 a longitudinal movement away from the row of grippers 5, is carried out, the link 24 is also driven longitudinally in the same direction thus swinging the cam levers 22 about their pivotal connections with the brackets 23, in the direction which takes the cams into contact with the segments 17 and which swings the latter, against the action of springs 21, about the rounded ribs 16 engaging the groove 15 in the plate unit 9, to close the teeth 10 and 18 on to the yarn ends. The mechanism has thus assumed the position shown in Figures 3 and 3A.

Figure 4:
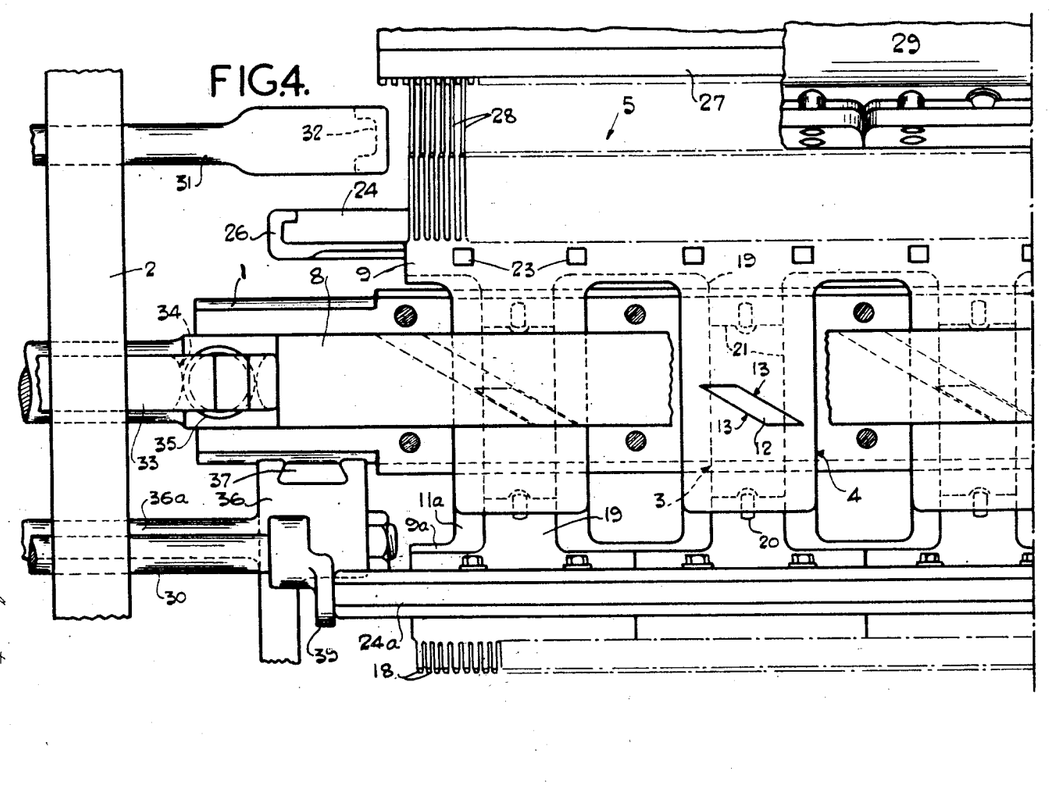
Figure 4A:
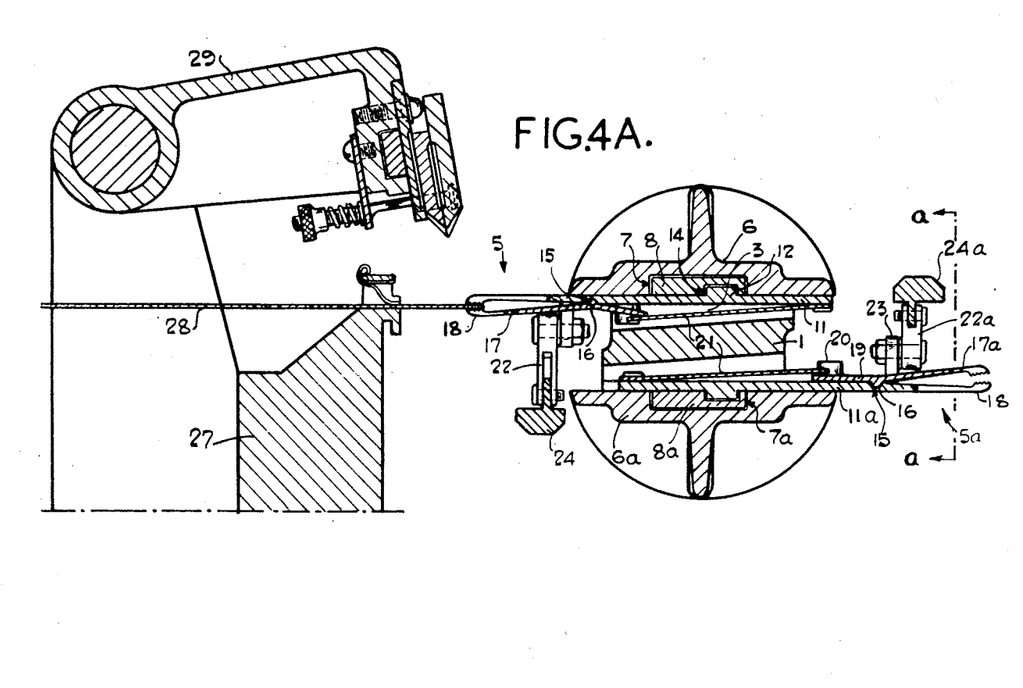

After the rod 31 has been returned to its initial position, thereby disengaging the hooks 26 and 32, the rod 33 is returned to its initial position together with the bar 8. This movement of the bar 8 is the gripper retracting stroke and causes the row of grippers to return to its initial position. Since the gripper jaws formed by the teeth 10 and 18, are now seizing the yarn ends, the latter are withdrawn from the carriage through a distance equal to the gripper retracting stroke, as shown in Figures 4 and 4A.

At or about the same time, the push rod 30 is caused to move inwardly of the frame 2, thereby imparting to the link 24a, through the finger 39, a longitudinal movement endwise of the beam 1 and causing the cam levers 22a to swing in the direction which takes the cams out of contact with the segment 17a to allow the said segments to be spring driven to their jaw opening positions. Therefore, the row of tufts 38, which by this time have been embodied in the carpet or fabric, is released.

Figure 5:
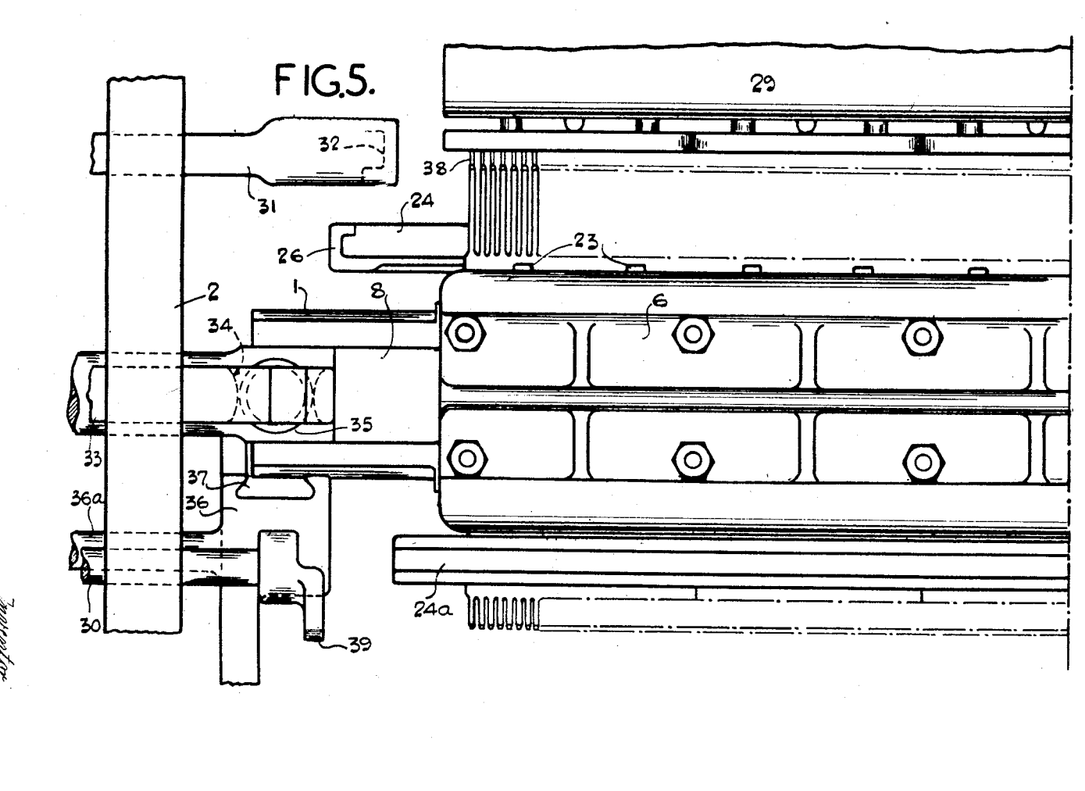

During the four stages of operation detailed above, the mechanism 29 has assumed a position wherein the cutters are raised at a distance above the yarns 28. During the final stage in the cycle of operations, the cutter mechanism is lowered to the position shown in Figures 5 and 5A and operated to sever the withdrawn yarn portions to form a second row of tufts which are gripped by the row of grippers 5. At or about the same time, the guide 36 is displaced away from the row of grippers 5a, thereby, due to the engagement of the roller 37 of the bar 8a with the arcuate runway 37, imparting a corresponding longitudinal movement to the said bar and retracting the gripper row 5a inwardly of the beam 1 (see Figures 5 and 5A); also the push rod 30 is returned to its initial position.

Figure 5A:
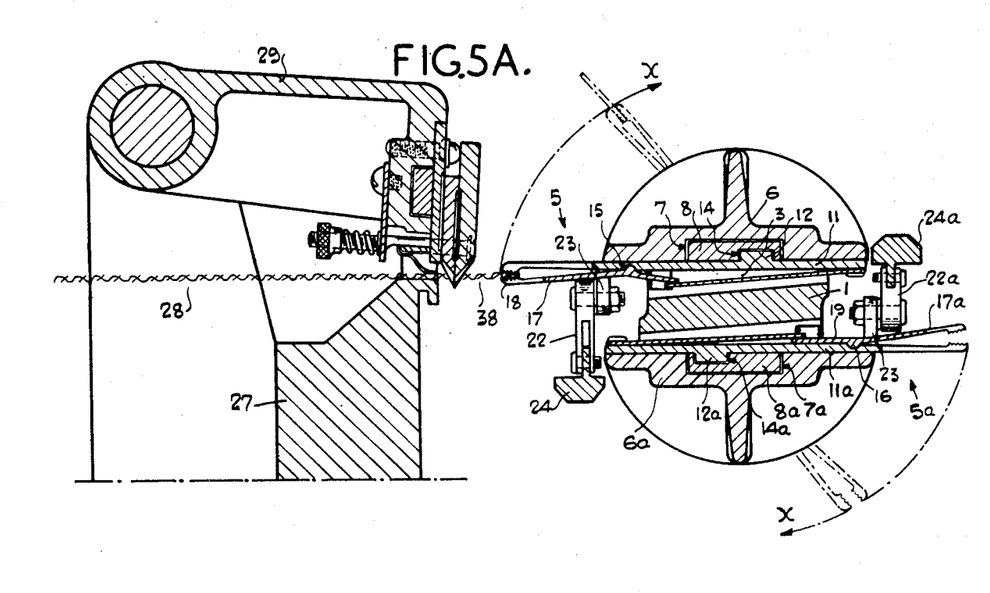

The beam is now moved through another 180° step in the direction indicated by the arrows $x$ in Figure 5A to take the tufts 38 held by the gripper row 5 into position ready for incorporation in the carpet or fabric. During the initial portion of this angular or rotational movement, the roller 35 on the bar 8, enters the runway of the guide 36, and, during the remainder of the said rotational movement, the guide is returned to its initial position thus driving the bar 8 through its gripper-extending stroke. The cycle of operations is then repeated.

The dwell between the successive intermittent rotational movements of the beam or gripper mechanism is only sufficient to enable the above described cycle of operations to be performed and to enable a row of tufts to be embodied in the carpet or fabric. These two separate operations can be performed in such a relatively short time period that it is possible for some one hundred or more rows of tufts to be embodied in the carpet or fabric per minute.

The above specifically described embodiment of the invention should be considered as illustrative only as obviously changes may be made therein without departing from the spirit or scope of the invention. For instance, the mechanism for imparting the intermittent rotary movements to the beam may include a manually actuated clutch so that, as and when desired, the beam and grippers may be rendered idle and inoperative without affecting the operation of any other part of the loom; also the clutch may be adapted to couple the beam-driving mechanism to a hand wheel or the like so that the said beam may be driven and the gripper mechanism may be operated at a slow speed by hand. Reference should therefore be had to the appended claims in determining the scope of the invention.

Having described my invention, what I claim and desire to secure by Letters Patent is:

1. Gripper mechanism for Axminster carpet and other tufted fabric looms comprising a beam having two opposed flat sides extending lengthwise thereof and formed with transverse recesses at intervals along their lengths, a rigid jaw plate carried on each of the said beam sides and having extensions from one edge, the said extensions slidably engaging complementary beam recesses, a cover plate fixed to each boss side and having a channel extending longitudinally thereof, a bar slidably accommodated in the channel and engaging each of the complementary plate extensions through a boss and slot connection, the slots being inclined to the axis of the said beam so that longitudinal movement of the said bar imparts movement to the said plate laterally of the said beam, a system of spring loaded segments hinged upon the said plate in end-to-end contact and means for swinging said segments against spring action.

2. Gripper mechanism for Axminster carpet and other tufted fabric looms comprising a beam having a row of grippers accommodated on each of two opposed sides thereof, the said gripper rows extending laterally of the said beam in opposite directions and each comprising a rigid jaw plate which extends, lengthwise of the said beam, is provided with extensions from one edge which slidably engage complementary transverse recesses in the said beam, and is formed with yarn gripping teeth along its opposite edge, a system of segments hinged adjacent one edge thereof upon and lengthwise of said jaw plate in end to end contact one with another, the said segment system being formed with yarn gripping teeth along its opposite edge, springs loading said segments and tending to swing them in the direction which separates the toothed edges of said jaw plate and said segment system, cam levers journalled upon complementary brackets extending from said jaw plate through each of said segments, said levers being coupled to a common link reciprocable lengthwise of the complementary gripper row for taking said cam levers into and out of contact with said segments to drive the latter against spring action and permit them to open under spring action for closing and opening said toothed edges, and means for reciprocating said jaw plate extensions in said beam recesses.

3. Gripper mechanism for Axminster carpet and other tufted fabric looms comprising a beam having a row of grippers accommodated on each of two opposed sides thereof, the said gripper rows extending laterally of the said beam in opposite directions and each comprising a rigid jaw plate which extends, lengthwise of the said beam, is provided with extensions from one edge which slidably engage complementary transverse recesses in the said beam, and is formed with yarn gripping teeth along its opposite edge, a system of segments hinged adjacent one edge thereof upon and lengthwise of said jaw plate in end to end contact one with another, the said segment system being formed with yarn gripping teeth along its opposite edge, springs loading said segments and tending to swing them in the direction which separates the toothed edges of said jaw plate and said segment system, a pair of cam levers associated with each of said segments, each of said levers being journalled upon a complementary bracket extending from said jaw plate through the complementary segment, all the said levers being coupled to a common link reciprocable lengthwise of the complementary gripper row for taking said cam levers into and out of contact with said segments to drive the latter against spring action and permit them to open under spring action for closing and opening said toothed edges, and means for reciprocating said jaw plate extensions in said beam recesses.

4. Gripper mechanism for Axminster carpet and other tufted fabric looms comprising a beam, a row of grippers slidably accommodated in each of two opposed sides of said beam, the said gripper rows extending and being slidable laterally of the said beam in opposite directions, individual means for sliding each of the said gripper rows relatively to the beam, and means for opening and closing the grippers of each row, each said gripper row comprising a rigid jaw plate having extensions from one edge which slidably engage transverse recesses in the complementary beam side and yarn gripping teeth along its opposite edge, a system of segments hinged in end-to-end contact upon and lengthwise of said jaw plate adjacent one edge of the said system, each segment having yarn gripping teeth along its opposite edge and an inclined tongue on the said hinged edge which tongue registers with a complementary plate extension, a leaf spring anchored to each of said extensions and bearing upon the complementary inclined segment tongue so that the said springs tend to retain said tongues in contact with said extensions and separate the toothed edges of the jaw plate and segment system, and means for swinging said segments against spring action to close said toothed edges.

5. Gripper mechanism for Axminster carpet and other tufted fabric looms comprising a beam, a row of grippers slidably accommodated in each of two opposed sides of said beam, the said gripper rows extending and being slidable laterally of the said beam in opposite directions, individual means for sliding each of the said gripper rows relatively to the beam, and means for opening and closing the grippers of each row, each said gripper row comprising a rigid jaw plate having extensions from one edge which slidably engage transverse recesses in the complementary beam side and yarn gripping teeth along its opposite edge, a system of segments hinged in end-to-end contact upon and lengthwise of said jaw plate adjacent one edge of the said system, each segment having yarn gripping teeth along its opposite edge and an inclined tongue on the said hinged edge which tongue registers with a complementary plate extension, a leaf spring anchored to each of said extensions and bearing upon the complementary inclined segment tongue so that the said springs tend to retain said tongues in contact with said extensions and separate the toothed edges of the jaw plate and segment system, brackets extending from said jaw plate through said segments, cam levers journalled to said brackets on the side of said segment system remote from said jaw plate, all said levers being journalled to a common reciprocable link to enable said levers to be taken into contact with said segments and displace the latter against spring action so as to close said toothed edges or to enable said levers to be taken out of contact with said segments so that the latter are spring driven in the direction which separates said toothed edges.

6. Gripper mechanism for Axminster carpet and other tufted fabric looms comprising a beam, a row of grippers accommodated on each of two opposed sides of the said beam and extending laterally of the latter in opposite directions, each row of grippers comprising a rigid jaw plate extending lengthwise of the said beam, having extensions from one edge which slidably engage complementary transverse recesses in the complementary beam side, and being formed with yarn gripping teeth along its opposite edge, a boss having parallel lateral edges inclined to the beam axis, on each plate extension, a reciprocable bar extending longitudinally of the beam and having slots therein each of which is engaged by a complementary extension boss and is inclined to the beam axis at the same angle as said boss edges, a system of spring loaded segments hinged adjacent one edge upon said jaw plate in end to end contact and having yarn gripping teeth formed along its opposite edge in register with said plate teeth, brackets extending from said plate through said segments, there being two brackets extending through each segment adjacent the opposite ends of the latter, a cam lever journalled upon each of said brackets on the side of the said system remote from said plate, all said levers being coupled to a common reciprocable link and being arranged to be taken into and out of contact with the complementary segments by endwise movement of said link to drive said segments against spring action for closing the said toothed edges of the plate and system, and to allow the said segments to be spring driven for separating said toothed edges, the said slotted bars and the said links extending beyond the ends of the two rows of grippers.

7. Axminster carpet and other tufted fabric looms comprising a beam rotatably mounted by its opposite ends in the loom frame, a row of grippers accommodated along each of two opposed sides of the said beam intermediate the beam ends, the said gripper rows extending laterally of the said beam in opposite directions and each comprising a rigid jaw plate slidably engaging the beam, a hinged jaw system mounted on said plate, a system of cams for swinging said jaw system to close the latter on to the said plate, a reciprocable link for actuating the said cams and a reciprocable bar for sliding the complementary row of grippers relatively to the beam, both the said links and the said bars extending beyond the ends of the grippers, reciprocable rods in the loom frame for actuating the said links, and a reciprocable rod and a reciprocable arcuate guide in the said frame for actuating the said bars during intermittent rotation of the beam through steps of 180°.

8. An Axminster carpet or other tufted fabric loom comprising a beam rotatably mounted by its ends in the loom frame, a row of grippers accommodated along each of two opposed sides of the beam intermediate the said ends, the said two gripper rows extending laterally of the beam in opposite directions and each comprising a fixed jaw plate having, on one edge, extensions which slidably engage complementary transverse recesses in the beam, and, on its opposite edge, a series of yarn gripping teeth, and a system of segments arranged in end to end contact which, adjacent one edge, is journalled upon the said jaw plate and, at its other edge, is formed with a series of yarn gripping teeth which register with the teeth on the said plate, springs loading the said segment system and tending to turn same in the direction which separates the two series of teeth, means mounted on each gripper row for closing the two series of teeth against spring action, means for reciprocating the said plate extensions in said beam recesses. reciprocable rods in the loom frame for actuating said tooth closing means, and a reciprocable rod and a reciprocable arcuate guide for actuating the said plate reciprocating means, during intermittent rotation of the said beam in steps of 180°.

9. Axminster and other tufted fabric looms comprising a beam rotatably mounted by its ends in the loom frame, a row of grippers accommodated along each of two opposed sides of the beam, the said rows extending and being slidable laterally of the said beam in opposite directions, a reciprocable arcuate guide in the loom frame for sliding one of the said gripper rows outwardly of the beam during each movement of the beam through 180° and inwardly of the said beam intermediate successive 180° movements of the beam, a reciprocable rod for sliding the other of the said gripper rows outwardly and inwardly of the beam intermediate successive beam movements of 180°, a reciprocable rod in the loom frame opening the jaws of the said first row of grippers prior to the said inwards movement thereof, and a reciprocable rod for closing the jaws of the said other row of grippers after the said outwards movement thereof.

10. Axminster and other tufted fabric looms comprising a beam rotatably mounted by its ends in the loom frame intermediate and parallel to a yarn carriage and a fixed bed where rows of tufts are embodied in the fabric, a row of grippers accommodated along each of two opposed sides of the beam and comprising a rigid jaw plate slidably engaging the complementary movement of the beam for reciprocating said bar to slide the complementary gripper row outwardly and inwardly of the beam between each two successive 180° movements of the beam, a reciprocable bar in the loom frame for opening the jaws of the said first mentioned row of grippers away from the bed prior to the movement of the said gripper row inwardly of the beam, and a reciprocable rod in the loom frame for closing the jaws of the said second row of grippers on to the ends of the yarns in the yarn carriage intermediate the outwards and inwards movement of the said second row.

11. Axminster or other tufted fabric looms according to claim 10 wherein each row of grippers comprises a rigid jaw plate having a series of yarn gripping teeth along one edge and extensions from its opposite edge which extensions slidably engage complementary transverse grooves in the beam side along which the gripper row is accommodated, each extension having a boss formed with parallel sides inclined to the axis of the beam and engaging a complementary groove which is inclined to the said beam axis at the same angle as the said inclined sides, a plurality of segments arranged in end-to-end contact lengthwise of the said plate to form the movable jaw system, each segment being formed along one edge with a series of yarn gripping teeth which register with certain of the teeth on the said plate, being hinged adjacent its other edge to the said plate, and having on its hinged edge an inclined tongue, a leaf spring, anchored to the rigid jaw plate, bearing on said tongue and tending to drive the latter in the direction which causes the toothed edge of the said movable jaw system to separate from the toothed edge of the said plate, brackets extending from the rigid jaw plate through each of the said segments, a cam lever journalled on the end of each bracket in the side of the movable jaw system remote from the rigid jaw plate, all the said levers being coupled to a common link extending lengthwise of the beam and registering, intermediate each two successive 180° movements of the said beam, with one or other of the two reciprocable jaw opening and closing rods on the loom frame.

12. Axminster or other tufted fabric looms according to claim 10 wherein each of the two bars for sliding the gripper rows inwardly and outwardly of the beam is slidably accommodated within a complementary cover plate fixed to each gripper-carrying beam side, and extends beyond one end of the gripper rows, the said projecting end being provided with a roller which engages the said arcuate guide as the complementary gripper row moves towards the fixed bed and a jaw in the reciprocable rod in the loom frame which reciprocates the said bar for moving the complementary row of grippers inwardly and outwardly of the beam, when the said gripper row is in alignment with the ends of the yarns in the yarn carriage.

13. Gripper mechanism for Axminster carpet and other tufted fabric looms, comprising one center beam journalled by its ends within the frame of the loom, a separate row of grippers slidably mounted upon each of the two opposed sides of the said beam, means for sliding each row of grippers in a path at right angles to the axis of the beam at predetermined positions during the rotation of the beam in angular movements of 180°, and means for opening and closing the said grippers at predetermined positions relatively to the beam.

14. Gripper mechanism for Axminster carpet and other tufted fabric looms, comprising a beam journalled by its ends within the frame of the loom, a portion of the beam between its journalled ends being of somewhat rectangular shape in cross section, a separate row of grippers slidably mounted on each of two opposed sides of the rectangular beam portion, means for sliding said rows of grippers in opposite directions outwardly of the beam along paths at right angles to the beam axis and at predetermined positions during the rotation of the beam in angular movements of 180°, means for opening and closing the said grippers, and means for returning the said rows to their initial positions relatively to the beam.

15. Gripper mechanism for Axminster carpet and other tufted fabric looms, comprising a beam journalled by its ends within the frame of the loom, a portion of the beam between its journalled ends being of somewhat rectangular shape in cross section, a separate row of grippers slidably mounted on each of two opposed sides of the rectangular beam portion, each row of grippers comprising a reciprocable jaw plate which is slidably mounted upon the beam, and a hinged jaw plate which is mounted and is tiltable upon the said reciprocable plate, means for sliding the said reciprocable jaw plates in opposite directions outwardly of the beam along paths at right angles to the beam axis and at predetermined positions during the rotation of the beam in angular movements of 180°, means for tilting the hinged jaw plates upon the said reciprocable jaw plate for opening and closing the grippers, and means for returning the said rows to their initial positions relatively to the beam.

16. Gripper mechanism for Axminster carpet and other tufted fabric looms, comprising a beam journalled by its ends within the frame of the loom, a portion of the beam between its journalled ends being of somewhat rectangular shape in cross section, a separate row of grippers slidably mounted on each of two opposed sides of the rectangular beam portion, each row of grippers comprising a reciprocable jaw plate which is slidably mounted upon the beam, and a system of hinged jaw plate units mounted in end to end contact upon the said reciprocable plate, means for sliding the said reciprocable jaw plates in opposite directions outwardly of the beam along paths at right angles to the beam axis and at predetermined positions during the rotation of the beam in angular movements of 180°, means for tilting the systems of hinged jaw plate units upon the reciprocable plates for opening and closing the grippers, and means for returning the said rows to their initial positions relatively to the beam.

17. Gripper mechanism for Axminster carpet and other tufted fabric looms, comprising a beam journalled by its ends within the frame of the loom, the said beam having, in each of two opposed sides thereof, a system of transverse channels, a cover plate assembled to each channelled side, a reciprocable jaw plate slidably accommodated between each cover plate and the beam, tongues projecting from one edge of each jaw plate and slidably engaging a transverse beam groove, the opposite edges of the said jaw plate projecting laterally of the beam and to opposite sides thereof and being formed with yarn gripping teeth, a hinged jaw plate mounted adjacent one edge thereof upon each reciprocable jaw plate and having yarn-gripping teeth formed in its opposite edge, means for reciprocating the said jaw plate assemblies upon the beam in paths at right angles to the beam axis at predetermined positions during the rotation of the beam in angular movements of 180°, and means for opening and closing the toothed edges of the complementary jaw plates.

18. Gripper mechanism for Axminster carpet and other tufted fabric looms, comprising a beam journalled by its ends within the frame of the loom, the said beam having, in each of two opposed sides thereof, a system of transverse channels, a cover plate assembled to each channelled side, a reciprocable jaw plate slidably accommodated between each cover plate and the beam, tongues projecting from one edge of each jaw plate and slidably engaging a transverse beam groove, the opposite edges of the said jaw plate projecting laterally of the beam and to opposite sides thereof and being formed with yarn gripping teeth, a hinged jaw plate mounted adjacent one edge thereof upon each reciprocable jaw plate, the said hinged jaw plate comprising a system of units arranged in end to end contact lengthwise of the said reciprocable plate, each unit having at its hinged edge a tail piece which is inclined away from the beam, a system of yarn gripping teeth along its opposite edge, a spring acting on each tail piece and tending to move it beamwards, cam means for swinging the hinged jaw plates against the action of the said springs to close the toothed edges of the complementary jaw plates, and means for reciprocating the said jaw plate assemblies upon the beam in paths at right angles to the beam axis and at predetermined positions during the rotation of the beam in angular movements of 180°.

19. Gripper mechanism for Axminster carpet and other tufted fabric looms, comprising a beam journalled by its ends within the frame of the loom, the said beam having, in each of two opposed sides thereof, a system of transverse channels, a cover plate assembled to each channelled side, a reciprocable jaw plate slidably accommodated between each cover plate and the beam, tongues projecting from one edge of each jaw plate and slidably engaging a transverse beam groove, the opposite edges of the said jaw plates projecting laterally of the beam and to opposite sides thereof and being formed with yarn gripping teeth, a longitudinally reciprocable bar accommodated between each cover plate and reciprocable jaw plate, the said bar being formed on its face adjacent the complementary jaw plate with channels inclined to the beam axis, bosses on each jaw plate engaging said channels, means for actuating the said bars to reciprocate the jaw plates in paths at right angles to the beam axis and at predetermined positions during the rotation of the beam in angular movements of 180°, a hinged jaw plate mounted, adjacent one edge thereof, upon each reciprocable jaw plate and having yarn gripping teeth formed in its opposite edge, and means for tilting the hinged plates upon the reciprocable plates to open and close the toothed edges of the complementary jaw plates.

CECIL CHARLES BRINTON.

REFERENCES CITED

The following references are of record in the file of this patent:

UNITED STATES PATENTS

| Number | Name | Date |
| --- | --- | --- |
| 1,428,786 | Lambert | Sept. 12, 1922 |